US011128130B2

(12) United States Patent
Luo et al.

(10) Patent No.: US 11,128,130 B2
(45) Date of Patent: Sep. 21, 2021

(54) PROTECTION CIRCUIT WITH BIDIRECTIONAL SURGE PROTECTION (71) Applicant: Shanghai Awinic Technology Co., LTD, Shanghai (CN)

(72) Inventors: Xucheng Luo, Shanghai (CN); Jiantao Cheng, Shanghai (CN); Jianwei Hu, Shanghai (CN); Chuankui Wu, Shanghai (CN); Yongqiang He, Shanghai (CN); Yan Jiang, Shanghai (CN)

(73) Assignee: Shanghai Awinic Technology Co., LTD, Shanghai (CN)

( * ) Notice: Subject to any disclaimer, the term of this patent is extended or adjusted under 35 U.S.C. 154(b) by 0 days.

(21) Appl. No.: 16/692,942

(22) Filed: Nov. 22, 2019

(65) Prior Publication Data
US 2020/0212672 A1 Jul. 2, 2020

(30) Foreign Application Priority Data
Dec. 26, 2018 (CN) .......................... 201811605090.1

(51) Int. Cl.
H02H 3/22 (2006.01)
H02H 9/04 (2006.01)
H02H 11/00 (2006.01)

(52) U.S. Cl.
CPC ............ H02H 9/045 (2013.01); H02H 9/041 (2013.01); H02H 11/003 (2013.01); H02H 3/22 (2013.01)

(58) Field of Classification Search
CPC .......... H02H 9/041; H02H 9/045; H02H 3/22; H02H 11/003; H02H 9/04; H02H 9/042; H02H 9/043
See application file for complete search history.

(56) References Cited

U.S. PATENT DOCUMENTS

| 5,027,250 A | * | 6/1991 | Cini ....................... H02H 9/046 361/90 |
| 5,436,786 A | * | 7/1995 | Pelly ...................... H02H 9/041 361/111 |

(Continued)

FOREIGN PATENT DOCUMENTS

JP       2011109790 A      6/2011

OTHER PUBLICATIONS

1st Korean Office Action regarding Application No. 10-2019-016217 dated Jun. 24, 2021. English translation provided by Unitalen Attorneys at Law.

*Primary Examiner* — Harry R Behm
(74) *Attorney, Agent, or Firm* — Harness, Dickey & Pierce, P.L.C.

(57) ABSTRACT

A protection circuit is provided. A control circuit receives an input voltage. In a case that the input voltage is lower than a negative threshold voltage, the control circuit outputs a first control voltage to a surge bleeder circuit through a first output end of the control circuit, to control the surge bleeder circuit to discharge the input voltage and output a first bleeder current. In a case that the input voltage is higher than a positive threshold voltage, the control circuit outputs a second control voltage to the surge bleeder circuit through a second output end of the control circuit, to control the surge bleeder circuit to discharge the input voltage and output a second bleeder current.

8 Claims, 2 Drawing Sheets

(56) References Cited

U.S. PATENT DOCUMENTS

| | | | |
|---|---|---|---|
| 2009/0268360 A1* | 10/2009 | Shinomiya | H02H 9/046 |
| | | | 361/56 |
| 2012/0120535 A1* | 5/2012 | Bauer | H02H 9/049 |
| | | | 361/91.5 |
| 2012/0300352 A1* | 11/2012 | de Palma | H02H 9/041 |
| | | | 361/91.5 |
| 2014/0233139 A1 | 8/2014 | Kang | |
| 2015/0303678 A1 | 10/2015 | Wang et al. | |
| 2016/0141867 A1* | 5/2016 | Boecker | H02H 9/041 |
| | | | 361/56 |
| 2018/0218675 A1* | 8/2018 | Zhang | H02M 1/36 |
| 2019/0123556 A1* | 4/2019 | Fang | H01L 27/0255 |

\* cited by examiner

PROTECTION CIRCUIT WITH BIDIRECTIONAL SURGE PROTECTION

The present application claims priority to Chinese Patent Application No. 201811605090.1, titled "PROTECTION CIRCUIT", filed on Dec. 26, 2018 with the Chinese Patent Office, which is incorporated herein by reference in its entirety.

FIELD

The present disclosure relates to the technical field of electricity, and in particular to a protection circuit.

BACKGROUND

"Electricity" is widely used in every field since its appearance. With the "electricity", the work and life style of people is significantly changed. At present, practically, the "electricity" is indispensable to every aspect of daily life, such as a computer, a television, a cellphone and a lamp.

An operating voltage of an element in an integrated circuit board with a high integration degree in the television and the cellphone is in a fixed range. Once a voltage inputted to the integrated circuit board is excessive high or excessive low, for example, a voltage generated due to reverse connection or a surge voltage, the element may be damaged. Although the surge voltage lasts for a short period, the voltage is high enough to damage an electrical appliance. A current direction in the reverse connection mode is opposite to a current direction when the electrical appliance operates normally, thus the electrical appliance may be easily damaged.

It is difficult to completely avoid the reverse connection and the surge voltage. Therefore, some measures are required to taken to protect the electrical appliance from the surge voltage or the reverse connection. The surge voltage includes a positive surge voltage and a negative surge voltage. In the conventional technology, only one of the positive surge protection or the negative surge protection can be achieved through a protection circuit. In a case that the positive surge protection or the negative surge protection are achieved through two different circuits respectively, the circuit becomes complicated, and the electric appliance has a large size, resulting in wasting of resources.

SUMMARY

In view of this, a protection circuit is provided according to embodiments of the present disclosure, to achieve reverse connection protection and surge protection.

A protection circuit is provided according to an embodiment of the present disclosure, which includes a first gate drive circuit, a second gate drive circuit, a transistor M2, a diode D2, a control circuit and a surge bleeder circuit. A first end of the first gate drive circuit is connected to a power supply input end, and a second end of the first gate drive circuit is connected to the surge bleeder circuit. A first terminal of the transistor M2 is connected to a power supply output end, a control terminal of the transistor M2 is connected to the second gate drive circuit, and a second terminal of the transistor M2 is connected to the surge bleeder circuit. An anode of the diode D2 is connected to the first terminal of the transistor M2, and a cathode of the diode D2 is connected to the second terminal of the transistor M2. A first end of the second gate drive circuit is connected to the power supply output end, and a second end of the second gate drive circuit is connected to the control terminal of the transistor M2. The control circuit is configured to: receive an input voltage; output a first control voltage to the surge bleeder circuit through a first output end of the control circuit, to control the surge bleeder circuit to perform discharging based on the first control voltage, to output a first bleeder current, in a case that the input voltage is lower than a preset negative threshold voltage; and output a second control voltage to the surge bleeder circuit through a second output end of the control circuit, to control the surge bleeder circuit to perform discharging based on the second control voltage, to output a second bleeder current, in a case that the input voltage is higher than a preset positive threshold voltage.

In another embodiment, the surge bleeder circuit includes a transistor M1, a transistor M3, a diode D1 and a diode D3. A first terminal of the transistor M1 is connected to the power supply input end, a second terminal of the transistor M1 is connected to the second terminal of the transistor M2 and a second terminal of the transistor M3, and a control terminal of the transistor M1 is connected to the first output end of the control circuit and the first gate drive circuit. An anode of the diode D1 is connected to the first terminal of the transistor M1, and a cathode of the diode D1 is connected to the second terminal of the transistor M1. A first terminal of the transistor M3 is grounded, and a control terminal of the transistor M3 is connected to the second output end of the control circuit. An anode of the diode D3 is connected to the first terminal of the transistor M3, and a cathode of the diode D3 is connected to the second terminal of the transistor M3.

In yet another embodiment, the control circuit includes a resistor R1, a resistor R2, a transistor M4, a diode D4, a diode Z1, a diode Z3, a zener diode Z2 and a zener diode Z4. A cathode of the diode Z1 is connected to a cathode of the zener diode Z2, and an anode of the diode Z1 is connected to the power supply input end. An anode of the zener diode Z2 serves as the second output end of the control circuit and is grounded through the resistor R1. A first terminal of the transistor M4 is connected to the power supply input end, a second terminal of the transistor M4 is connected to the first output end of the control circuit through the resistor R2, and a control terminal of the transistor M4 is connected to the cathode of the diode D3. An anode of the diode D4 is connected to the first terminal of the transistor M4, and a cathode of the diode D4 is connected to the second terminal of the transistor M4. A cathode of the diode Z3 is connected to a cathode of the zener diode Z4, and an anode of the diode Z3 is grounded. An anode of the zener diode Z4 is connected to the first output end of the control circuit.

Based on the protection circuit according to the embodiment of the present disclosure, the control circuit receives the input voltage. In a case that the input voltage is lower than a negative threshold voltage, the control circuit outputs the first control voltage to the surge bleeder circuit through the first output end of the control circuit, to control the surge bleeder circuit to discharge the input voltage, to output the first bleeder current. In a case that the input voltage is higher than a positive threshold voltage, the control circuit outputs the second control voltage to the surge bleeder circuit through the second output end of the control circuit, to control the surge bleeder circuit to discharge the input voltage, to output the second bleeder current. In a case that the input voltage is higher than zero and lower than the positive threshold voltage, the first gate drive circuit supplies a first drive voltage to the control circuit, and the second gate drive circuit supplies a second drive voltage to the control circuit. The surge bleeder circuit supplies power to a post-stage circuit connected to the power supply output end based on the first drive voltage and the second drive voltage. With the above circuit according to the embodiment of the present disclosure, electronic components in a post-stage of a power supply can be protected from a surge voltage and a negative voltage generated due to the reverse connection.

BRIEF DESCRIPTION OF THE DRAWINGS

In order to illustrate technical solutions in embodiments of the present disclosure or in the conventional technology clearer, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

The technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

In this specification, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

At present, an existing protection circuit applied to an integrated circuit generally achieves only one of reverse connection protection and surge protection. The reverse connection protection and the surge protection cannot be achieved in one circuit. In a case that two different circuits are used to achieve the reverse connection protection and the surge protection respectively, the integrated circuit becomes complicated, and an electric appliance has a large size, resulting in wasting of resources.

Figure 1:
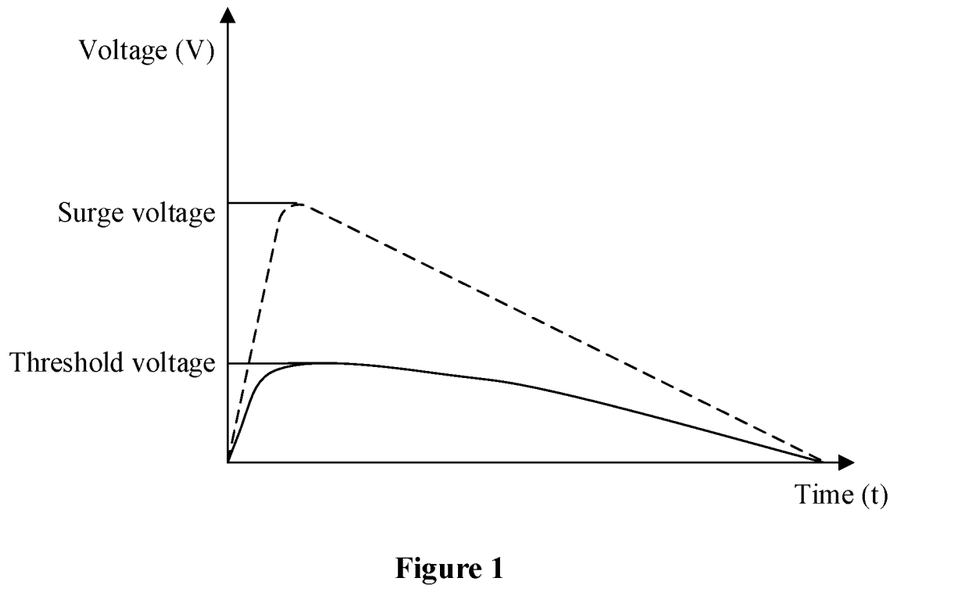
FIG. 1 is a schematic diagram showing an effect of a protection circuit according to an embodiment of the present disclosure.

In view of the above problems, a protection circuit is provided according to an embodiment of the present disclosure. The protection circuit is arranged between a power supply and a to-be-protected circuit. Reference is made to FIG. 1, which is a schematic diagram showing an effect of a protection circuit according to an embodiment of the present disclosure. The protection circuit can protect an electronic component in a post-stage of a power supply from a surge voltage and a negative voltage generated due to the reverse connection, and supply a voltage within a normal operating voltage range to the electronic component in the post-stage of the power supply. For example, the protection circuit is arranged between a charger and a charging interface. The charger serves as the power supply and is connected to a power supply input end, and the charging interface and a battery serve as a charging power supply and are connected to a power supply output end. The protection circuit according to the embodiment of the present disclosure supplies power to the charging interface, to ensure that an operating voltage of the charging interface is in a normal operating voltage range, so as to protect the charging interface and the battery arranged behind the charging interface.

Specific implementations of the present disclosure are described below with reference to a schematic structural diagram of a protection circuit.

Figure 2:
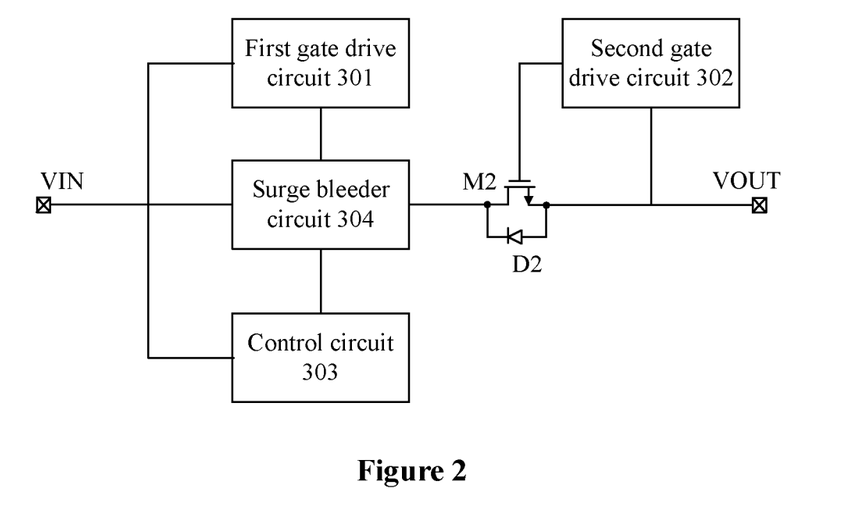
FIG. 2 is a schematic structural diagram of a protection circuit according to an embodiment of the present disclosure.

Reference is made to FIG. 2, which is a schematic structural diagram of a protection circuit according to an embodiment of the present disclosure. The protection circuit includes a first gate drive circuit 301, a second gate drive circuit 302, a transistor M2, a diode D2, a control circuit 303 and a surge bleeder circuit 304.

A first end of the first gate drive circuit 301 is connected to a power supply input end, and a second end of the first gate drive circuit 301 is connected to the surge bleeder circuit 304.

It should be noted that the first gate drive circuit 301 is configured to control an electronic component functioning as a switch in the surge bleeder circuit 304. The first gate drive circuit 301 outputs a first drive voltage in a case that an input voltage is in a normal operating voltage range, that is, the input voltage is higher than zero and lower than a positive threshold voltage, to control an electronic component in the surge bleeder circuit to be turned on. Multiple circuits having the above function in the conventional technology may serve as the first gate drive circuit. Any circuit which has the same function as the first gate drive circuit should fall within the protection scope of the present disclosure.

A first terminal of the transistor M2 is connected to a power supply output end, and a control terminal of the transistor M2 is connected to the second gate drive circuit.

It should be noted that the transistor M2 may be a metal oxide semiconductor (MOS) transistor, where a source is the first terminal, a drain is a second terminal, and a gate is the control terminal. Further, the transistor M2 may be an N-channel metal oxide semiconductor (NMOS) transistor. A second drive voltage is higher than a turn-on voltage of the transistor M2.

An anode of the diode D2 is connected to the first terminal of the transistor M2, and a cathode of the diode D2 is connected to a second terminal of the transistor M2.

It should be noted that the diode D2 may be a parasitic body diode for the transistor M2 or a common diode.

A first end of the second gate drive circuit 302 is connected to the power supply output end, and a second end of the second gate drive circuit 302 is connected to the control terminal of the transistor M2.

It should be noted that the second gate drive circuit 302 is configured to control the transistor M2. The second gate drive circuit 302 outputs a second drive voltage in a case that the input voltage is in the normal operating voltage range, that is, the input voltage is higher than zero and lower than the positive threshold voltage, to control the transistor M2 to be turned on. Multiple circuits having the above function in the conventional technology may serve as the second gate drive circuit. Any circuit which has the same function as the second gate drive circuit should fall within the protection scope of the present disclosure.

The control circuit 303 is configured to receive the input voltage. In a case that the input voltage is lower than a preset negative threshold voltage, the control circuit 303 outputs a first control voltage to the surge bleeder circuit through a first output end of the control circuit 303, to control the surge bleeder circuit to perform discharging based on the first control voltage, to output a first bleeder current. In a case that the input voltage is higher than a preset positive threshold voltage, the control circuit 303 outputs a second control voltage to the surge bleeder circuit through a second output end of the control circuit 303, to control the surge bleeder circuit to perform discharging based on the second control voltage, to output a second bleeder current.

The preset negative threshold voltage is lower than zero and used to determine whether the input voltage is a negative surge voltage. The preset positive threshold voltage is higher than zero and used to determine whether the input voltage is a positive surge voltage.

In addition, the first control voltage and the second control voltage are used to control the electronic component functioning as a switch in the surge bleeder circuit.

In a case that the input voltage is lower than the preset negative threshold voltage, the control circuit 303 outputs the first control voltage. In a case that the input voltage is higher than the preset positive threshold voltage, the control circuit 303 outputs the second control voltage.

It should be noted that the input voltage indicates an electric potential difference obtained after an electric potential of the power supply input end minus an electric potential of ground. In a case that the electric potential of the power supply input end is higher than the electric potential of the ground, the input voltage is higher than zero. In a case that the electric potential of the power supply input end is lower than the electric potential of the ground, the input voltage is lower than zero. The threshold voltage is used to determine whether the input voltage is a surge voltage. The threshold voltage may be determined by selecting the electronic component with appropriate specifications.

The surge bleeder circuit 304 is configured to: discharge the input voltage based on the first control voltage, to output the first bleeder current; and discharge the input voltage based on the second control voltage, to output the second bleeder current.

The surge bleeder circuit 304 is further configured to supply power to the second terminal of the transistor M2 based on the first drive voltage. In a case that the transistor M2 is turned on under control of the second drive voltage, the surge bleeder circuit 304 and the transistor M2 supply power to a circuit connected to the power supply output end, to output the operating current.

In a case that the surge bleeder circuit 304 receives the first control voltage, the input voltage is the negative surge voltage, and the negative surge voltage is discharged.

In a case that the surge bleeder circuit 304 receives the second control voltage, the input voltage is the positive surge voltage, and the positive surge voltage is discharged.

In a case that the surge bleeder circuit 304 receives the first drive voltage and the second drive voltage, the input voltage is a normal operating voltage, and a normal operating current is outputted.

A protection circuit is provided according to the embodiment of the present disclosure. The control circuit 303 receives the input voltage. In a case that the input voltage is lower than the negative threshold voltage, the control circuit 303 outputs the first control voltage to the surge bleeder circuit 304 through the first output end of the control circuit 303, to control the surge bleeder circuit 304 to discharge the input voltage, to output the first bleeder current. In a case that the input voltage is higher than the positive threshold voltage, the control circuit 303 outputs the second control voltage to the surge bleeder circuit 304 through the second output end of the control circuit 303, to control the surge bleeder circuit 304 to discharge the input voltage, to output the second bleeder current. In a case that the input voltage is higher than zero and lower than the positive threshold voltage, the first gate drive circuit supplies the first drive voltage to the surge bleeder circuit, and the second gate drive circuit supplies the second drive voltage to the transistor M2. The surge bleeder circuit supplies power to a post-stage circuit connected to the power supply output end based on the first drive voltage, and the transistor M2 supplies power to the post-stage circuit connected to the power supply output end based on the second drive voltage. With the above circuit according to the embodiment of the present disclosure, the electronic component in the post-stage of the power supply can be protected from the surge voltage and the negative voltage generated due to the reverse connection.

Figure 3:
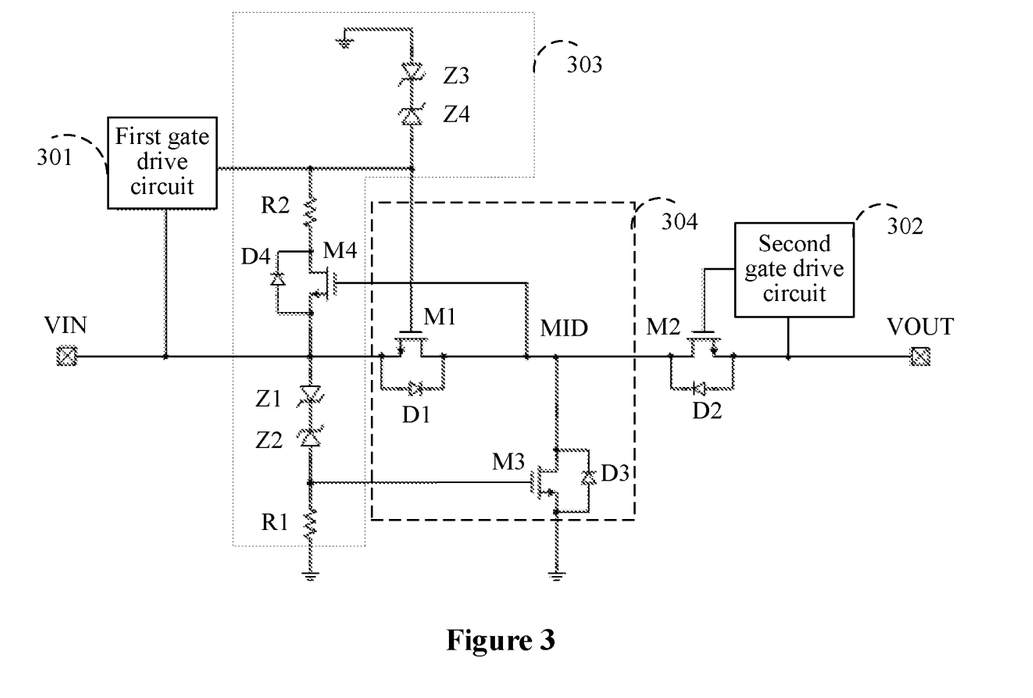
FIG. 3 is a schematic circuit diagram of a protection circuit according to an embodiment of the present disclosure.

A protection circuit is provided according to an embodiment of the present disclosure. Reference is made to FIG. 3, which shows an implementation of the surge bleeder circuit 304 in the protection circuit according to an embodiment of the present disclosure. The surge bleeder circuit 304 includes a transistor M1, a transistor M3, a diode D1 and a diode D3.

A first terminal of the transistor M1 is connected to the power supply input end, a second terminal of the transistor M1 is connected to the second terminal of the transistor M2 and a second terminal of the transistor M3, and a control terminal of the transistor M1 is connected to the first output end of the control circuit and the first gate drive circuit.

It should be noted that the transistor M1 may be an MOS transistor, where a source is the first terminal, a drain is a second terminal, and a gate is the control terminal. Further, the transistor M1 may be an NMOS transistor. The first drive voltage and the first control voltage are higher than a turn-on voltage of the transistor M1.

An anode of the diode D1 is connected to the first terminal of the transistor M1, and a cathode of the diode D1 is connected to the second terminal of the transistor M1.

It should be noted that the diode D1 may be a parasitic body diode for the transistor M1 or a common diode.

A first terminal of the transistor M3 is grounded, and a control terminal of the transistor M3 is connected to the second output end of the control circuit.

It should be noted that the transistor M3 may be an MOS transistor, where a source is the first terminal, a drain is a second terminal, and a gate is the control terminal. Further, the transistor M3 may be an NMOS transistor. The second control voltage is higher than a turn-on voltage of the transistor M3.

An anode of the diode D3 is connected to the first terminal of the transistor M3, and a cathode of the diode D3 is connected to the second terminal of the transistor M3.

It should be noted that the diode D3 may be a parasitic body diode for the transistor M3 or a common diode.

With the protection circuit according to the embodiment of the present disclosure, the control circuit receives the input voltage. In a case that the input voltage is lower than the negative threshold voltage, the control circuit outputs the first control voltage to the surge bleeder circuit through the first output end of the control circuit, to control the surge bleeder circuit to discharge the input voltage, to output the first bleeder current. In a case that the input voltage is higher than the positive threshold voltage, the control circuit outputs the second control voltage to the surge bleeder circuit through the second output end of the control circuit, to control the surge bleeder circuit to discharge the input voltage, to output the second bleeder current. In a case that the input voltage is higher than zero and lower than the positive threshold voltage, the first gate drive circuit supplies the first drive voltage to the surge bleeder circuit, and the second gate drive circuit supplies the second drive voltage to the transistor M2. The surge bleeder circuit supplies power to a post-stage circuit connected to the power supply output end based on the first drive voltage, and the transistor M2 supplies power to the post-stage circuit connected to the power supply output end based on the second drive voltage. With the above circuit according to the embodiment of the present disclosure, the electronic component in the post-stage of the power supply can be protected from the surge voltage and the negative voltage generated due to the reverse connection.

Further, in a case that the input voltage is lower than the preset negative threshold voltage, the control terminal of the transistor M1 receives the first control voltage, such that the transistor M1 is turned on. The input voltage being the negative surge voltage is discharged to the ground through channels of the transistor M1 and the diode D3, to protect a circuit and the electronic component in a post-stage of the power supply output end from the negative surge voltage. In a case that the input voltage is higher than a preset positive threshold voltage, the control terminal of the transistor M3 receives the second control voltage, such that the transistor M3 is turned on. The input voltage being the positive surge voltage is discharged to the ground through channels of the transistor M3 and the diode D1. In a case that the input voltage is higher than zero and lower than the preset positive threshold voltage, the transistor M1 receives the first drive voltage, such that the transistor M1 is turned on. The transistor M2 receives the second drive voltage, such that the transistor M2 is turned on. The input voltage is transmitted to the power supply output end through channels of the transistor M1 and the transistor M2, to output the operating current. In a case that the input voltage is lower than zero and higher than the preset negative threshold voltage, that is, the circuit is reversely connected, the surge bleeder circuit does not receive the control voltage and the drive voltage, the transistor M2 is not turned on, thereby protecting the circuit or the electronic component in the post-stage of the power supply output end from the negative voltage generated due to the reverse connection.

A protection circuit is provided according to an embodiment of the present disclosure. Reference is made to FIG. 3, which shows an implementation of the control circuit 303 in the protection circuit according to an embodiment of the present disclosure. The control circuit 303 includes a resistor R1, a resistor R2, a transistor M4, a diode D4, a diode Z1, a diode Z3, a zener diode Z2 and a zener diode Z4.

A cathode of the diode Z1 is connected to a cathode of the zener diode Z2, and an anode of the diode Z1 is connected to the power supply input end.

It should be noted that the diode Z1 is configured to receive the input voltage. The anode of the diode Z1 may be connected to the power supply input end through the diode D1. That is, the anode of the diode Z1 may be connected to the cathode of the diode D1, to receive the input voltage through the diode D1.

An anode of the zener diode Z2 serves as the second output end of the control circuit 303 and is grounded through the resistor R1.

It should be noted that the number of the zener diode Z2 may be one or more. The positive threshold voltage may be set by arranging the zener diode Z2. The anode of the diode Z3 serves as the second output end of the control circuit 303, to output the second control voltage.

A first terminal of the transistor M4 is connected to the power supply input end, a second terminal of the transistor M4 is connected to the first output end of the control circuit through the resistor R2, and a control terminal of the transistor M4 is connected to the cathode of the diode D3.

It should be noted that the transistor M4 may be an MOS transistor, where a source is the first terminal, a drain is a second terminal, and a gate is the control terminal. Further, the transistor M4 may be an NMOS transistor.

An anode of the diode D4 is connected to the first terminal of the transistor M4, and a cathode of the diode D4 is connected to the second terminal of the transistor M4.

It should be noted that the diode D4 may be a parasitic body diode for the transistor M4 or a common diode.

A cathode of the diode Z3 is connected to a cathode of the zener diode Z4, and an anode of the diode Z3 is grounded.

An anode of the zener diode Z4 is connected to the first output end of the control circuit.

It should be noted that the number of the zener diode Z4 may be one or more. The negative threshold voltage may be set by arranging the zener diode Z4. The anode of the zener diode Z4 serves as the first output end of the control circuit 303, to output the first control voltage.

With the protection circuit according to the embodiment of the present disclosure, the control circuit receives the input voltage. In a case that the input voltage is lower than the negative threshold voltage, the control circuit outputs the first control voltage to the surge bleeder circuit through the first output end of the control circuit, to control the surge bleeder circuit to discharge the input voltage, to output the first bleeder current. In a case that the input voltage is higher than the positive threshold voltage, the control circuit outputs the second control voltage to the surge bleeder circuit through the second output end of the control circuit, to control the surge bleeder circuit to discharge the input voltage, to output the second bleeder current. In a case that the input voltage is higher than zero and lower than the positive threshold voltage, the first gate drive circuit supplies the first drive voltage to the surge bleeder circuit, and the second gate drive circuit supplies the second drive voltage to the transistor M2. The surge bleeder circuit supplies power to a post-stage circuit connected to the power supply output end based on the first drive voltage, and the transistor M2 supplies power to the post-stage circuit connected to the power supply output end based on the second drive voltage. With the above circuit according to the embodiment of the present disclosure, the electronic component in the post-stage of the power supply can be protected from the surge voltage and the negative voltage generated due to the reverse connection.

Further, in a case that the input voltage is lower than the preset negative threshold voltage, the control terminal of the transistor M1 receives the first control voltage, such that the transistor M1 is turned on. The input voltage being the negative surge voltage is discharged to the ground through channels of the transistor M1 and the diode D3, to protect a circuit and the electronic component in a post-stage of the power supply output end from the negative surge voltage. In a case that the input voltage is higher than a preset positive threshold voltage, the control terminal of the transistor M3 receives the second control voltage, such that the transistor M3 is turned on. The input voltage being the positive surge voltage is discharged to the ground through channels of the transistor M3 and the diode D1. In a case that the input voltage is higher than zero and lower than the preset positive threshold voltage, the transistor M1 receives the first drive voltage, such that the transistor M1 is turned on. The transistor M2 receives the second drive voltage, such that the transistor M2 is turned on. The input voltage is transmitted to the power supply output end through channels of the transistor M1 and the transistor M2, to output the operating current. In a case that the input voltage is lower than zero and higher than the preset negative threshold voltage, that is, the circuit is reversely connected, the surge bleeder circuit does not receive the control voltage and the second drive voltage, the transistor M2 is not turned on, thereby protecting the circuit or the electronic component in the post-stage of the power supply output end from the negative voltage generated due to the reverse connection.

Further, in a case that the input voltage is lower than the preset negative threshold voltage, the control circuit outputs the first control voltage to the surge bleeder circuit through the first output end of the control circuit. The surge bleeder circuit performs discharging on the input voltage being the negative surge voltage based on the first control voltage, to output the first bleeder current. In a case that the input voltage is higher than the preset positive threshold voltage, the control circuit outputs the second control voltage to the surge bleeder circuit through the second output end of the control circuit. The surge bleeder circuit performs discharging on the input voltage being the positive surge voltage based on the second control voltage, to output the second bleeder current.

In combination with the protection circuit provided in the above embodiment, referring to FIG. 3, the protection circuit according to the embodiment of the present disclosure is applied as follows.

The protection circuit is integrated in a charging interface of a cellphone. An interface of a power supply is connected to a battery of the cellphone through a charging line. The supply power is a charger of the cellphone.

Each of the transistor M1, the transistor M2, the transistor M3 and the transistor M4 is implemented by an NMOS transistor with a turn-on voltage of 1V.

Each of the zener diode Z2 and the zener diode Z4 is implemented by a zener diode with a reverse breakdown voltage of 10V. Each of the diode Z1, the diode Z3, the diode D1, the diode D2, the diode D3 and the diode D4 is implemented by a common diode with a forward turn-on voltage of 0.7V and a reverse breakdown voltage higher than 30V.

Each of the resistor R1 and the resistor R2 is implemented by a resistor with a resistance of 100Ω.

Therefore, in the circuit, the negative threshold voltage is equal to −11.7V, and the positive threshold voltage is equal to 11.7V.

The principle of preventing a negative surge is described as follows. In a case that the input voltage is lower than −11.7V, a source voltage of the transistor M4 is equal to −11.7V, and a gate voltage of the transistor M4 is equal to −0.7V. A gate source voltage of the transistor M4 is equal to 10V, which is higher than the turn-on voltage of the transistor M4, thus the transistor M4 is turned on. In this case, a circuit from the diode Z3 to the power supply input end via the zener diode Z4, the resistor R2 and the transistor M4 is turned on to form a loop. The diode Z3 is forwardly turned on. The zener diode Z4 is reversely broken down. The anode of the zener diode Z4 is connected to the power supply input end through the resistor R2 and channels of the transistor M4. A voltage across the resistor R2 is higher than the turn-on voltage of the transistor M1, thus the transistor M1 is turned on. The negative surge voltage is discharged through channels of the transistor M1 and the diode D3, to output a bleeder current.

The principle of preventing the reverse connection is described as follows. In a case that the input voltage is higher than −11.7V and lower than 0V, specifically, if the input voltage is higher than −1V and lower than 0V, a gate source voltage of the transistor M1 does not reach the threshold voltage of the transistor M1, thus the transistor M1 is not turned on. If the input voltage is higher than −11.7V and lower than −1V, the transistor M4 is turned on. A gate and a source of the transistor M1 are connected through the resistor R2 and the transistor M4. A gate source voltage of the transistor M1 is lower than the turn-on voltage of the transistor M1, thus the transistor M1 is turned off. In this case, since the diode D1 is in a reverse bias state, a middle point (MID) cannot receive the negative voltage. Therefore, the post-stage circuit or component of the protection circuit according to the embodiment of the present disclosure cannot receive the negative voltage.

The principle of a normal operation mode is described as follows. In a case that the input voltage is higher than 0V and lower than 11.7V, the first gate drive circuit supplies the first drive voltage to the transistor M1, so that the transistor M1 is turned on. The second gate drive circuit supplies the second drive voltage to the transistor M2, so that the transistor M2 is turned on. The power supply supplies power to a circuit and a battery that are connected to the power supply output end through channels of the transistor M1 and the transistor M2, to normally charge the battery.

The principle of preventing a positive surge is described as follows. In case that the input voltage is higher than 11.7V, the diode Z1 is forwardly turned on, and the zener diode Z2 is reversely broken down. The power supply is grounded through the diode Z1, the zener diode Z2 and the resistor R1, to form a loop. In this case, a voltage across the resistor R1 is higher than the turn-on voltage of the transistor M3, thus the transistor M3 is turned on. The power supply input end is grounded through the diode D1 and channels of the transistor M3, so that the positive surge voltage is discharged, to output a bleeder current.

After the above process, the post-stage circuit cannot receive the negative voltage, thereby protecting the post-stage circuit from the surge voltage and negative voltage generated due to the reverse connection.

The embodiments in this specification are described in a progressive way, each of which emphasizes the differences from others, and the same or similar parts among the embodiments can be referred to each other. Since the system disclosed in the embodiments is basically similar to the method therein, the description thereof is relatively simple, and for relevant matters, one may refer to the description of the method. The system and embodiments of the system described in the above are merely illustrative. Units described as separate components may be or may not be physically separated. Components shown as units may be or may not be physical units, that is, may be located in one location or may be distributed in multiple network units. Parts or all of the modules may be selected based on actual conditions, to implement the technical solutions of the present disclosure. Those skilled in the art can understand and carry out the present disclosure without any creative effort.

Those skilled in the art should further understand that units and algorithm steps described in combination with the disclosed embodiments may be implemented by electronic hardware, computer software or a combination thereof. In order to clearly describe interchangeability of the hardware and the software, components and steps of each embodiment are generally described above based on functions. Whether the functions are realized by hardware or software is determined by specific applications of the technical solutions and design constraints. For each of the specific applications, those skilled in the art may adopt a specific implementation to realize the functions described above, and the implementation should fall within the scope of the present disclosure.

With the description of the embodiments disclosed above, those skilled in the art may implement or use technical solutions of the present disclosure. Numerous modifications to the embodiments are apparent to those skilled in the art, and the general principles defined herein may be implemented in other embodiments without departing from the spirit or scope of the present disclosure. Therefore, the present disclosure may not be limited to the embodiments described herein, but should comply with the widest scope consistent with the principles and novel features disclosed herein.

The invention claimed is:

1. A protection circuit for power supply, comprising:
   a first gate drive circuit;
   a second gate drive circuit;
   a transistor M2;
   a diode D2;
   a control circuit; and
   a surge bleeder circuit, wherein
   a first end of the first gate drive circuit is connected to a power supply input end, and a second end of the first gate drive circuit is connected to the surge bleeder circuit;
   a first terminal of the transistor M2 is connected to a power supply output end, a control terminal of the transistor M2 is connected to the second gate drive circuit, and a second terminal of the transistor M2 is connected to the surge bleeder circuit;
   an anode of the diode D2 is connected to the first terminal of the transistor M2, and a cathode of the diode D2 is connected to the second terminal of the transistor M2;
   a first end of the second gate drive circuit is connected to the power supply output end, and a second end of the second gate drive circuit is connected to the control terminal of the transistor M2; and
   the control circuit is configured to: receive an input voltage; output a first control voltage to the surge bleeder circuit through a first output end of the control circuit, to control the surge bleeder circuit to perform discharging based on the first control voltage and output a first bleeder current, in a case that the input voltage is lower than a preset negative threshold voltage; and output a second control voltage to the surge bleeder circuit through a second output end of the control circuit, to control the surge bleeder circuit to perform discharging based on the second control voltage and output a second bleeder current, in a case that the input voltage is higher than a preset positive threshold voltage;
   wherein the control circuit comprises:
   a resistor R1;
   a resistor R2;
   a transistor M4;
   a diode D4;
   a diode Z1;
   a diode Z3;
   a zener diode Z2; and
   a zener diode Z4, and wherein:
   a cathode of the diode Z1 is connected to a cathode of the zener diode Z2, and an anode of the diode Z1 is connected to the power supply input end;
   an anode of the zener diode Z2 serves as the second output end of the control circuit and is grounded through the resistor R1;
   a first terminal of the transistor M4 is connected to the power supply input end, a second terminal of the transistor M4 is connected to the first output end of the control circuit through the resistor R2;
   an anode of the diode D4 is connected to the first terminal of the transistor M4, and a cathode of the diode D4 is connected to the second terminal of the transistor M4;
   a cathode of the diode Z3 is connected to a cathode of the zener diode Z4, and an anode of the diode Z3 is grounded; and
   an anode of the zener diode Z4 is connected to the first output end of the control circuit.

2. The circuit according to claim 1, wherein the surge bleeder circuit comprises:
   a transistor M1;
   a transistor M3;
   a diode D1; and
   a diode D3, wherein:
   a first terminal of the transistor M1 is connected to the power supply input end, a second terminal of the transistor M1 is connected to the second terminal of the transistor M2 and a second terminal of the transistor M3, and a control terminal of the transistor M1 is connected to the first output end of the control circuit and the first gate drive circuit;
   an anode of the diode D1 is connected to the first terminal of the transistor M1, and a cathode of the diode D1 is connected to the second terminal of the transistor M1;
   a first terminal of the transistor M3 is grounded, and a control terminal of the transistor M3 is connected to the second output end of the control circuit; and
   an anode of the diode D3 is connected to the first terminal of the transistor M3, a cathode of the diode D3 is connected to the second terminal of the transistor M3, and a control terminal of the transistor M4 is connected to the cathode of the diode D3.

3. The circuit according to claim 1, wherein the first gate drive circuit is configured to output a first drive voltage in a case that an input voltage is a positive voltage and less than the preset positive threshold voltage, to control channels of corresponding devices in the surge bleeder circuit to be turned on.

4. The circuit according to claim 1, wherein the second gate drive circuit is configured to output a second drive voltage in a case that an input voltage is a positive voltage and less than the preset positive threshold voltage, to control the transistor M2 to be turned on.

5. The circuit according to claim 1, wherein the transistor M2 is an N-Metal-Oxide-Semiconductor (NMOS) transistor.

6. The circuit according to claim 1, wherein the diode D2 is a parasitic diode of the transistor M2 or a common diode.

7. The circuit according to claim 1, wherein the number of the zener diode Z2 is equal to or greater than one.

8. A protection circuit for power supply, comprising:
a control circuit, comprising an input end and at least one output end, wherein the at least output end comprises a first output end and a second output end; and
a surge bleeder circuit, connected to the control circuit and coupled between a power supply and a ground; and
a switch coupled to the surge bleeder circuit and an output end of the protection circuit,
wherein the control circuit comprises:
a resistor R1;
a resistor R2;
a transistor M4;
a diode D4;
a diode Z1;
a diode Z3;
a zener diode Z2; and
a zener diode Z4, and wherein:
a cathode of the diode Z1 is connected to a cathode of the zener diode Z2, and an anode of the diode Z1 is connected to the power supply input end;
an anode of the zener diode Z2 serves as the second output end of the control circuit and is grounded through the resistor R1;
a first terminal of the transistor M4 is connected to the power supply input end, a second terminal of the transistor M4 is connected to the first output end of the control circuit through the resistor R2;
an anode of the diode D4 is connected to the first terminal of the transistor M4, and a cathode of the diode D4 is connected to the second terminal of the transistor M4;
a cathode of the diode Z3 is connected to a cathode of the zener diode Z4, and an anode of the diode Z3 is grounded; and
an anode of the zener diode Z4 is connected to the first output end of the control circuit; and
wherein the control circuit is configured to: receive an input voltage; output a first control voltage to the surge bleeder circuit through a first output end of the control circuit, to control the surge bleeder circuit to perform discharging based on the first control voltage and output a first bleeder current, in a case that the input voltage is lower than a preset negative threshold voltage; and output a second control voltage to the surge bleeder circuit through a second output end of the control circuit, to control the surge bleeder circuit to perform discharging based on the second control voltage and output a second bleeder current, in a case that the input voltage is higher than a preset positive threshold voltage.

* * * * *